(12) United States Patent
Sylvester et al.

(10) Patent No.: US 11,936,009 B2
(45) Date of Patent: Mar. 19, 2024

(54) ELECTRIC BATTERIES

(71) Applicant: DUKOSI LIMITED, Penicuik Lothian (GB)

(72) Inventors: Joel Sylvester, Penicuik (GB); Paul Record, Edinburgh (GB)

(73) Assignee: DUKOSI LIMITED, Edinburgh (GB)

(*) Notice: Subject to any disclaimer, the term of this patent is extended or adjusted under 35 U.S.C. 154(b) by 0 days.

(21) Appl. No.: 17/728,742

(22) Filed: Apr. 25, 2022

(65) Prior Publication Data

US 2022/0255146 A1    Aug. 11, 2022

Related U.S. Application Data

(63) Continuation of application No. 16/313,880, filed as application No. PCT/GB2017/051945 on Jun. 30, 2017, now Pat. No. 11,316,209.

(30) Foreign Application Priority Data

Jul. 1, 2016 (GB) .................................... 1611532

(51) Int. Cl.
*H01M 10/42* (2006.01)
*H01M 10/0525* (2010.01)
(Continued)

(52) U.S. Cl.
CPC ..... *H01M 10/425* (2013.01); *H01M 10/0525* (2013.01); *H04B 5/0031* (2013.01);
(Continued)

(58) Field of Classification Search
CPC ........... H01M 10/425; H01M 10/0525; H01M 10/052; H01M 2010/4271; H01M 2010/4278; H04B 5/0031
See application file for complete search history.

(56) References Cited

U.S. PATENT DOCUMENTS 6,835,131 B1 * 12/2004 White ................... H04B 5/00
273/237
8,427,373 B2 * 4/2013 Jiang ................. H01Q 9/0407
343/846

(Continued)

FOREIGN PATENT DOCUMENTS

CN        101187972 A    5/2008
CN        101188438 A    5/2008
(Continued)

OTHER PUBLICATIONS 177 45854, Decision to Grant a European Patent, dated Dec. 17, 2020 (Year: 2020).

(Continued)

*Primary Examiner* — Alexander Usyatinsky
(74) *Attorney, Agent, or Firm* — FINNEGAN, HENDERSON, FARABOW, GARRETT & DUNNER LLP

(57) ABSTRACT

The present invention relates to an arrangement 10 comprising plural electric battery cell modules. Each of the electric battery cell modules comprises at least one electric battery cell 12 and a module antenna 14. The arrangement further comprises a transmission line 16 operative as an antenna. The arrangement 10 is configured to provide near field electromagnetic coupling of data between the transmission line 16 and each of the plural battery cell modules by way of the module antenna 14.

20 Claims, 3 Drawing Sheets

(51) Int. Cl.
*H04B 5/00* (2006.01)
*H01M 10/052* (2010.01)

(52) U.S. Cl.
CPC .. *H01M 10/052* (2013.01); *H01M 2010/4271* (2013.01); *H01M 2010/4278* (2013.01)

(56) References Cited

U.S. PATENT DOCUMENTS

| | | | |
|---|---|---|---|
| 2004/0061652 A1* | 4/2004 | Ishihara | H01Q 9/36 343/700 MS |
| 2006/0205421 A1* | 9/2006 | Record | H04B 7/269 455/502 |
| 2007/0096919 A1* | 5/2007 | Knadle, Jr. | H01Q 9/0435 235/492 |
| 2008/0119135 A1 | 5/2008 | Washiro | |
| 2011/0140541 A1* | 6/2011 | Ryu | H02J 7/0045 307/104 |
| 2011/0291836 A1 | 12/2011 | Deavours et al. | |
| 2012/0206102 A1 | 8/2012 | Okamura et al. | |
| 2013/0329925 A1 | 12/2013 | Boguslavskij et al. | |

FOREIGN PATENT DOCUMENTS

| | | |
|---|---|---|
| CN | 101507047 A | 8/2009 |
| CN | 101752603 A | 6/2010 |
| CN | 102119453 A | 7/2011 |
| CN | 102637915 A | 8/2012 |
| CN | 202856390 U | 4/2013 |
| CN | 103250298 A | 8/2013 |
| CN | 103354963 A | 10/2013 |
| CN | 103474709 A | 12/2013 |
| CN | 104054093 A | 9/2014 |
| CN | 104064803 A | 9/2014 |
| CN | 204809903 U | 11/2015 |
| EP | 1926223 A2 | 5/2008 |
| EP | 2401697 A1 | 1/2012 |
| EP | 2495883 * | 9/2012 |
| EP | 2495883 A2 | 9/2012 |
| EP | 2565959 * | 3/2013 |
| EP | 2565959 A2 | 3/2013 |
| EP | 2645447 A1 | 10/2013 |
| EP | 2645464 A1 | 10/2013 |
| EP | 2782158 A1 | 9/2014 |
| JP | 2012222913 A | 11/2012 |
| WO | WO 2007/056157 A2 | 5/2007 |
| WO | WO 2009/149471 A1 | 12/2009 |
| WO | WO 2010/099266 A1 | 9/2010 |
| WO | WO 2013/067269 A1 | 5/2013 |
| WO | WO 2015/143625 A1 | 10/2015 |

OTHER PUBLICATIONS

201780039706, Notification to Grant Patent (Year: 2021).
International Search Report of Related PCT Application No. PCT/GB2017/051945.
Search Report issued by the Chinese Patent Office in related Chinese Patent No. 201780039706.0, dated Oct. 12, 2019.
Supplemental Search Report issued by the Chinese Patent Office in related Chinese Patent No. 201780039706.0, dated Mar. 15, 2021.
The Examination Report, pursuant to Article 94(3) EPC, dated Nov. 18, 2019 in related European Patent Application No. 17745854.4.
The Extended European Search Report, pursuant to Rule 62 EPC, dated Aug. 9, 2021 in related European Patent Application 21151033.4.

* cited by examiner

ELECTRIC BATTERIES

CROSS-REFERENCE TO RELATED PATENT APPLICATIONS

This application is a continuation of U.S. application Ser. No. 16/313,880, filed Dec. 27, 2018, which is a National Stage Entry of PCT Application No. PCT/GB2017/051945, filed Jun. 30, 2017 and published as WO 2018/002667 A1, which claims the benefit of GB Application No. 1611532.1, filed Jul. 1, 2016. The entire contents of the above-referenced applications are hereby incorporated by reference in their entireties.

FIELD OF THE INVENTION

The present invention relates to an arrangement comprising plural electric battery cell modules and to an electric battery arrangement comprising plural electric battery cell modules.

BACKGROUND ART

Lithium-ion battery cells have seen widespread use in small consumer devices such as laptop computers and mobile telephones. Lithium-ion batteries have begun recently to supplant conventional batteries in applications having greater electrical energy demands, such as electrical vehicles and static electricity generation apparatus. Lithium-ion batteries are seeing increased use on account of their normally superior performance over conventional batteries, such as lead-acid and NiMH batteries, in particular in respect of energy storage density and power density. To meet electrical energy demand in such larger energy demand applications a battery is typically comprised of plural lithium-ion battery cells which are arranged in at least one of series and parallel depending on current and voltage requirements.

Battery management systems for lithium-ion battery arrangements are known. Such a battery management system typically measures properties such as current, voltage and temperature in a battery and makes determinations concerning safe and effective operation based on the measurements. Battery management systems typically involve communication between each individual battery cell or each group of battery cells and management circuitry. Some known approaches make use of wired digital communication. For example according to a known approach, battery cells are configured as plural modules with non-isolated wired communication within each module and isolated wired communication according to the CAN bus protocol outside the modules. Isolation is required in respect of communication between individual battery cells or modules because each battery cell or module sits at a different voltage relative to system ground. The variation in voltage relative to system ground may amount to many hundreds of volts in a typical battery arrangement. Isolation to many kilovolts may therefore be required.

Other known communication approaches make use of wireless communication protocols provided by the like of WiFi or ZigBee compliant circuitry operating on top of a Physical Layer such as provided by Short Range Devices (SRDs) according to ERC Recommendation 70-03. In such other known approaches, each battery cell or group of battery cells comprises an antenna and communicates by way of a broadcast radio channel to all of the other battery cells or groups of battery cells. The thus established wireless network is multi-drop in nature and is therefore suited to multi-cell battery application. A multi-drop network comprises slave nodes and a master node which may control timing of communication and may be operative as an interface to external systems. The slave nodes are connected to the network in the same fashion. Any slave node can drop out of the network without compromising the operation or communication capability of the remaining slave nodes. The multi-drop network is therefore advantageous for multi-cell battery arrangements which often comprise a large number of cells or groups of cells with each multi-cell battery arrangement having one of many different configurations.

The above described radio frequency communication approaches are intended for operation in far field applications. In far field applications at frequencies up to 10 GHz or thereabout, each of the plural antennas is electrically short, i.e. each antenna is shorter than a wavelength of the radio waves, and the plural antennas are separated from each other by many wavelengths whereby the radio channels operate properly. However the present inventors have appreciated that in a typical battery application the dimensions of the battery are such that the antennas are separated from each other by distances that are up to around one wavelength. The reduction in separation from intended operation creates standing waves which give rise to peaks and troughs in radio signal strength whereby performance is degraded.

Furthermore, the above described open to air radio frequency networks are susceptible to external interference. Measures are therefore taken to address the effects of external interference such as enclosing the whole battery arrangement within a metal screen. However screening can compromise network performance. Providing for complete screening, for example by placing a metal lid over the battery arrangement, has been found in certain circumstances to give rise to standing waves in the screen which can cause battery cells or modules to lose communication.

The present invention has been devised in light of the inventors' appreciation of the above-mentioned problems with known radio frequency communication approaches. It is therefore an object for the present invention to provide an improved arrangement comprising plural electric battery cell modules, the arrangement being configured for electromagnetic coupling of data within the arrangement. It is a further object for the present invention to provide an improved electric battery arrangement comprising plural electric battery cell modules, the electric battery arrangement being configured for electromagnetic coupling of data within the electric battery arrangement.

STATEMENT OF INVENTION

According to a first aspect of the present invention there is provided an arrangement comprising:
plural electric battery cell modules, each of the electric battery cell modules comprising at least one electric battery cell and a module antenna; and
a transmission line operative as an antenna,
the arrangement being configured to provide near field electromagnetic coupling of data between the transmission line and each of the plural battery cell modules by way of the module antenna.

The arrangement according to the present invention comprises plural electric battery cell modules and a transmission line operative as an antenna. Each of the electric battery cell modules comprises at least one electric battery cell and a module antenna. At least one of the electric battery cell modules may comprise plural electric battery cells. The arrangement is configured to provide near field electromagnetic coupling and more specifically near field radio wave coupling of data between the transmission line and each of the plural cell modules by way of the module antenna of the cell module. An arrangement comprising plural module antennas and more specifically plural spaced apart module antennas which are each in communication with a transmission line may provide a means to address the above-mentioned problems associated with known radio frequency communication approaches. Use of a transmission line may provide for the plural module antennas being disposed more closely to the transmission line than the module antennas of the prior art are disposed in relation to each other whereby the above-mentioned problems may be addressed.

The transmission line may be elongated and the arrangement may be configured such that the module antennas are disposed along the transmission line. The module antennas may therefore be relatively close to the transmission line. The module antennas may be disposed at substantially the same distance from the transmission line. The transmission line may be a two-conductor transmission line. The transmission line may comprise an elongated conductor and a ground plane, the elongated conductor being substantially parallel to the ground plane. The transmission line may comprise a microstrip. According to another embodiment, the transmission line may comprise coaxial cable. According to yet another embodiment, the transmission line may comprise twisted pair cable. Where the transmission line comprises at least one of coaxial cable and twisted pair cable a battery cell module may comprise a recess for accommodating the cable, the recess being disposed and configured to provide for alignment of the cable with the module antenna. More specifically and where the transmission line comprises twisted pair cable, the recess may be configured such that the two conductors lie generally and more specifically substantially in a plane orthogonal to a plane in which the module antenna lies. According to a further embodiment, the transmission line may comprise solely one conductor.

Near field in the present context may be construed as involving a separation between the transmission line and each module antenna of less than one wavelength of electromagnetic radiation and more specifically of radio waves coupling data between the transmission line and the module antenna. For example, the near field region may be less than 327 mm when the wavelength is 327 mm. More predominantly near field electromagnetic coupling may take place when the separation is substantially less than one wavelength such as less than one tenth of one wavelength. The arrangement may be configured such that each of the plural module antennas is spaced apart from the transmission line by no more than a half, one third, one quarter, one fifth, one sixth, one seventh, one eighth, one ninth or one tenth of the wavelength of electromagnetic radiation. Where the arrangement comprises a transmitter, as described below, the transmitter may be configured to provide for emission of electromagnetic radiation of a desired wavelength.

As mentioned above, performance is degraded in certain known radio frequency communication approaches. In near field communication networks, power absorbed by a device attached to the network may be reflected to another device attached to the network. This effect is used in inductive chargers whereby a transmitter in the charger senses the presence of a receiver and controls the power accordingly. However, this effect is liable to compromise performance in the like of multi-drop networks because each additional receiver imposes an additional load on the transmitter. Use of a transmission line according to the present invention may provide for location of the module antennas close to the transmission line. The configuration of the module antennas may provide for a reduction in coupling strength from the coupling strength of the known radio frequency communication approaches whereby the loading effect may be addressed. Reduction in coupling strength may reduce reflections from each module antenna whereby a larger number of module antennas may each establish a communication channel with the transmission line without degrading performance to an impractical extent.

The Voltage Standing Wave Ratio (VSWR) is a measure of radio frequency system performance and is the ratio of the maximum and minimum AC voltages along the transmission line. It may be desirable for all the module antennas to see the same level of power to within a certain margin. In certain forms and where the arrangement comprises an end termination, the VSWR may be no more than 1.5 whereby the sum of the power reflected from the module antennas and the end termination may be no more than 20%. A coupling strength and more specifically each of a forward voltage gain and a reverse voltage gain between the transmission line and a module antenna may be of an according maximum magnitude to maintain the overall VSWR within a predetermined limit having regard to the effect of all module antennas.

On the other hand, the coupling strength may be required to be greater than a certain level having regard to the noise floor to provide for proper decoding by a receiver of a received signal. There may therefore be a compromise in respect of coupling strength between maintaining the VSWR within a predetermined limit and providing sufficient power to properly decode a received signal. In certain forms, the coupling strength may be at least −85 dB and more specifically may be at least −85 dB+X dB where X is a coupling strength margin such as 10 dB.

A coupling strength per communication channel may reduce in dependence on the number of communication channels in the arrangement, each of the communication channels being established between the transmission line and a different one of the module antennas. More specifically the coupling strength per communication channel may reduce substantially linearly as the number of communication channels increases.

At least one of the plural module antennas may be a loop antenna. The module antenna may not be configured for operation as a resonant antenna and more specifically may not be configured for operation as a resonant loop antenna. The module antenna may therefore be electrically short. Where the arrangement comprises a transmitter, as described below, the transmitter may be configured accordingly for emission of electromagnetic radiation. The module antenna may be a small loop antenna. A small loop antenna or magnetic loop may have a size, such as a maximum dimension, of less than about one tenth of a wavelength of emitted electromagnetic radiation. For example, the size of the small loop antenna may be about 14 mm and the wavelength of the emitted electromagnetic radiation may be 327 mm. Although the term loop antenna is used herein the loop of the antenna may be generally or perhaps substantially rectilinear, such as may be formed by four straight sides of substantially the same length.

The data coupled between the transmission line and each of the plural battery cell modules may comprise at least one of measurement data, such as data based on measurements made by way of at least one sensor at a battery cell module, and control data, such as data for effecting control of circuitry at a battery cell module.

The arrangement may be configured such that a multi-drop network is formed. The arrangement may therefore comprise plural slave nodes and a master node. Each of the plural slave nodes may comprise an electric battery cell module. The master node may comprise the transmission line. The master node may comprise battery management system circuitry. The battery management system circuitry may be configured to receive data from the electric battery cell modules by way of the transmission line and to process the received data. Alternatively or in addition the battery management system circuitry may be configured to generate control data and to provide for the generated control data being conveyed to the electric battery cell modules by way of the transmission line. Alternatively or in addition the battery management system circuitry may be configured to control timing of communication between the transmission line and the module antennas. Alternatively or in addition the battery management system circuitry may be configured to be operative as an interface to at least one system external to the arrangement, for example an external supervisory or monitoring system operative on computing apparatus.

The arrangement may further comprise at least one of a primary receiver and a primary transmitter and more specifically a primary transceiver which may be at an end of the transmission line. The primary receiver may be an active receiver. The primary transmitter may be an active transmitter. The primary transceiver may be an active transceiver. The arrangement may further comprise an end termination which may be at an end of the transmission line opposite the at least one of a primary receiver and a primary transmitter. The arrangement may be configured such that in the absence of any module antenna substantially all energy in the transmission line is absorbed by the end termination.

An electric battery cell module may comprise at least one of a module receiver and a module transmitter and more specifically a module transceiver. The module receiver may be an active receiver. The module transmitter may be an active transmitter. The module transceiver may be an active transceiver.

A gap between the transmission line and a module antenna may comprise dielectric material. The dielectric material may be solid such as a plastics material. Alternatively or in addition, the dielectric material may be gaseous such as air.

Each electric battery cell may comprise an electrochemical arrangement. The electrochemical arrangement may comprise a lithium-ion electrochemical arrangement and more specifically a lithium-ion polymer electrochemical arrangement.

The arrangement may be configured such that the plural electric battery cell modules may not be electrically coupled to each other such that no electric battery per se is formed. The plural electric battery cell modules may be in storage such as in a warehouse or in a container such as in a shipping container. Therefore, the transmission line may be comprised in a storage arrangement. For example, the transmission line may be comprised in a rack in a warehouse, the rack supporting the plural electric battery cell modules. By way of another example, the transmission line may be comprised in a shipping container holding the plural electric battery cell modules. The arrangement may thus be configured to provide for battery management operations whilst the plural electric battery cell modules are in the like of storage or transport and not operative together as an electric battery.

Alternatively the arrangement may be configured such that the plural electric battery cell modules are electrically coupled to each other such that an electric battery is formed. Therefore, according to a second aspect of the present invention there is provided an electric battery arrangement comprising the arrangement according to the first aspect of the present invention, the plural electric battery cell modules being electrically coupled to form an electric battery.

The electric battery arrangement according to the second aspect of the present invention may be configured to provide for near field electromagnetic coupling of data, for example when the electric battery arrangement is operative as an electric battery in an electric vehicle or in static electricity generation apparatus.

Embodiments of the second aspect of the present invention may comprise one or more features of the first aspect of the present invention.

According to a further aspect of the present invention there is provided an arrangement comprising: plural electric battery cell modules, each of the electric battery cell modules comprising at least one electric battery cell and a module antenna; and a primary antenna, the arrangement being configured to provide electromagnetic coupling of data between the primary antenna and each of the plural battery cell modules by way of the module antenna.

The primary antenna may comprise a transmission line. Alternatively or in addition, the arrangement may be configured to provide near field electromagnetic coupling of data between the primary antenna and each of the plural battery cell modules by way of the module antenna. Further embodiments of the further aspect of the present invention may comprise one or more features of the first aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1:
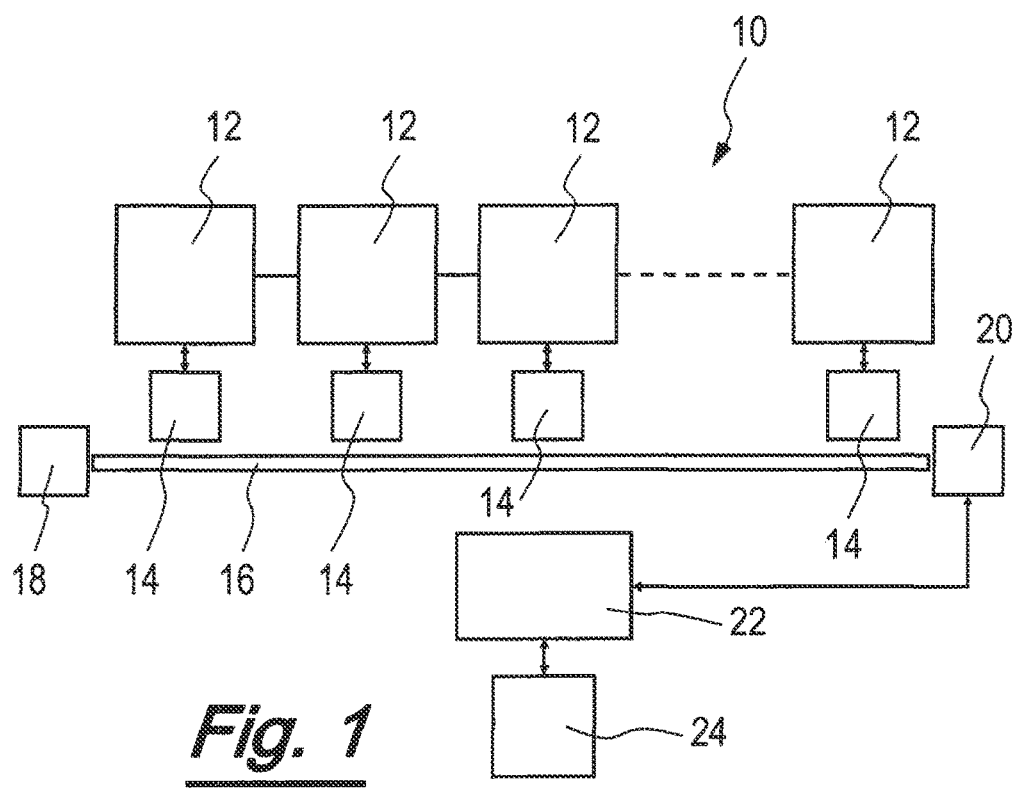
FIG. 1 is a block diagram representation of an electric battery arrangement according to an embodiment of the present invention.

A block diagram representation of an electric battery arrangement 10 according to an embodiment of the present invention is shown in FIG. 1. The electric battery arrangement 10 comprises plural lithium-ion polymer electric battery cells 12 which are electrically coupled together to form an electric battery which provides required levels of voltage and current in dependence on the combined contribution of the electric battery cells. Each electric battery cell 12 comprises current, voltage and temperature sensors and circuitry configured to perform signal conditioning on sensed signals and to convert sensed signals into digital form. Each electric battery cell 12 also comprises a microprocessor which is operative to receive sensed signals in digital form and to form data packets in digital form comprising data based on the sensed signals. Each electric battery cell 12 further comprises an active transceiver which is electrically coupled to a module antenna 14. The transceiver is configured to receive the data packets from the microprocessor and to transmit the data packets by way of the module antenna 14. The transceiver is also configured to receive data packets comprising control data from the module antenna and to convey the received data packets to the microprocessor. The microprocessor is then operative to extract the control data from the thus received data packets for application of the extracted control data in the electric battery cell 12. The control data provides, for example, for the like of connection and disconnection of the electric battery cell 12 from the other electric battery cells and control of charge balancing between electric battery cells.

The electric battery arrangement 10 further comprises an elongated transmission line in the form of a microstrip 16 which extends along the electric battery cells 12 such that it is close to the module antennas comprised in the electric battery cells. The transmission line is operative as an antenna. The transmission line 16 is terminated at one end with an end termination 18 of 50 Ohms such that the end termination is matched to the characteristic impedance of the transmission line. The other end of the transmission line 16 is electrically coupled to a primary active transceiver 20 which is configured to couple data packets to and from the transmission line. The form and function of the module antennas and the transmission line are described further below with reference to FIG. 2. The electric battery arrangement 10 yet further comprises battery management system circuitry 22 which is configured to receive data packets comprising measurement data from the primary transceiver 20 and to send data packets comprising control data to the primary transceiver 20. The battery management system circuitry 22 is operative to perform processing of measurement data extracted from received data packets, to make determinations based on the extracted measurement data and to generate control data based on the determinations with such control data then being formed as data packets for transmission to one or more electric battery cells 12. The battery management system circuitry 22 is also configured to control timing of communication between the transmission line 16 and the module antennas 14. The battery management system circuitry 22 is further configured to be operative as an interface to a system 24 external to the electric battery arrangement 10. The external system 24 is, for example, a supervisory or monitoring system operative on computing apparatus.

In another un-illustrated embodiment of the present invention the electric battery cells 12 of the embodiment of FIG. 1 are not electrically coupled together whereby no electric battery is formed. This embodiment is constituted when the plural electric battery cells are in storage such as in a warehouse or in a transport container such as in a shipping container. According to the storage application, the transmission line is comprised in the like of a rack in a warehouse, the rack supporting the electric battery cells. According to the transport application, the transmission line is comprised in the like of a shipping container holding the electric battery cells. Otherwise the present embodiment is of the same form and function as described herein with reference to FIGS. 1 to 5. The second embodiment is thus configured to provide for battery management operations whilst the electric battery cells are in the like of storage or transport and are not operative together as an electric battery.

Figure 2:
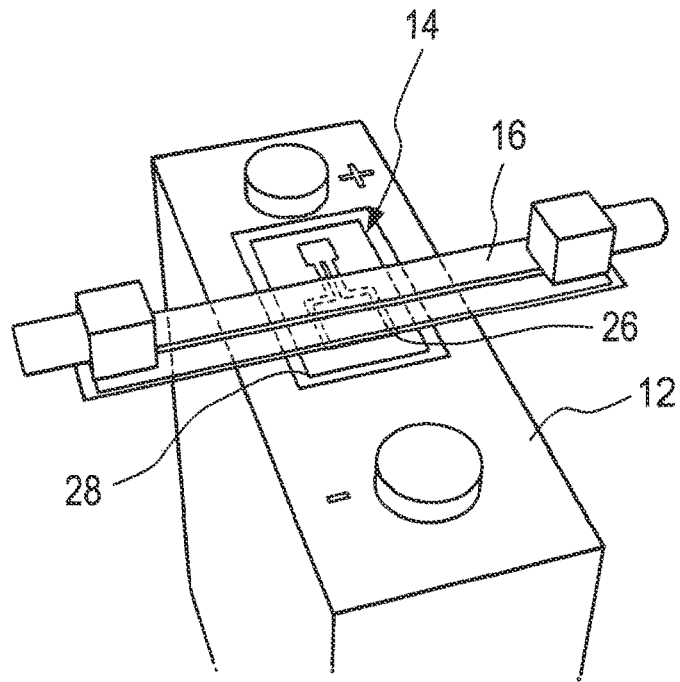
FIG. 2 shows the transmission line and one of the electric battery cells of the electric battery arrangement of FIG. 1.

The transmission line 16 of the electric battery arrangement 10 of FIG. 1 is shown in FIG. 2 for clarity with only one 12 of the electric battery cells. As can be seen from FIG. 2, the module antenna 14 has the form of a single loop 26 of rectilinear form which is backed by a ground plane 28. Each side of the loop 26 is 10 mm long. The module antenna 14 is located at the top of the electric battery cell 12 such that the transmission line 16 is positioned over the module antenna with a gap of a few millimetres in between. The gap is filled with a dielectric material, for example a gaseous dielectric such as air or a solid dielectric such as of a plastics material. The transmission line 16 has the form of a microstrip such that it comprises a single PCB track of predetermined width with a ground plane on the other side of the PCB supporting the single PCB track. The transceivers of the electric battery arrangement 10 are Short Range Device (SRD) transceiver devices operating at 868 MHz and 915 MHz.

In another embodiment, the transmission line 16 of FIG. 2 is replaced with coaxial cable. A recess is formed in a solid dielectric layer present above the module antenna such that the recess follows the same path as the transmission line 16 shown in FIG. 2 whereby the recess is aligned with a centreline of the module antenna. The coaxial cable is received in the recess.

In yet another embodiment the transmission line 16 of FIG. 2 is replaced with twisted pair cable. As per the previous embodiment, a recess is formed in a solid dielectric layer above the module antenna such that the recess follows the same path as the transmission line 16 shown in FIG. 2 whereby the recess is aligned with a centreline of the module antenna. The recess of the present embodiment is of a width such that when the twisted pair cable is received in the recess the two conductors of the twisted pair cable are constrained to lie substantially in a plane orthogonal to the plane in which the module antenna lies. The two conductors of the twisted pair cable should preferably be arranged such that they do not cross each other where a module antenna is present and should preferably, in so far is possible, lie parallel to each other where a module antenna is present.

In a further embodiment, the transmission line 16 of FIG. 2 is replaced with a single conductor. As per the previous embodiment, a recess is formed in a solid dielectric layer above the module antenna such that the recess follows the same path as the transmission line 16 shown in FIG. 2 whereby the recess is aligned with a centreline of the module antenna. The single conductor is received in the recess.

Operation of the electric battery arrangement 10 will now be described with reference to FIGS. 1 and 2. In the absence of the module antennas 14, the transmission line 16 is matched to the primary transceiver 20 whereby all the energy transmitted by the primary transceiver 20 is absorbed by the end termination 18. When a module antenna 14 is located under the transmission line 16, it causes a reflection or mismatch at that location on the transmission line 16. The mismatch causes reflections which in turn cause standing waves to form along the transmission line 16. The standing waves appear as peaks and dips as one moves along the transmission line 16. The Voltage Standing Wave Ratio or VSWR is a measure of system matching. The VSWR is the ratio of the maximum and minimum AC voltages along the transmission line 16. An ideal system has a ratio of 1.0, i.e. no peaks or troughs along the transmission line. To ensure that all the electric battery cell transceivers see much the same energy (i.e. no or minimal peaks or troughs) the VSWR as seen by the transmission line 16 should be kept below a predetermined value. In the present application, the VSWR is no more than 1.5. This means that the sum of the power reflected from all of the module antennas 14 and the end termination 18 should be less than about 20%. To reduce reflections from each module antenna 14, the coupling strength between the module antenna and the transmission line 16 should be kept very low. The electric battery arrangement 10 is thus configured to provide near field weak electromagnetic coupling of data between the transmission line and each of the battery cells. Calculations relating to operation of the electric battery arrangement 10 will now be provided.

As mentioned above, it is desired that the overall VSWR be maintained at a level no is more than 1.5. This means that the reflection coefficient seen at the primary transceiver 20 should be less than 0.2. The total reflection from the communication network, as seen from the primary transceiver 20, is given by:

$$\rho_{in} = S_{11} + \sum_{Ncells} \frac{S_{12}S_{21}}{1 - S_{22}\rho_l} \cdot \rho_l \qquad \text{Equation 1}$$

where $\rho_{in}$ is the reflection coefficient seen at the primary transceiver, $\rho_l$ is the reflection seen at the module antenna, and $S_{xy}$ are the scattering parameters for that antenna connected to the communication network. The summation is over Ncells, i.e. the number of module antennas.

The most important scattering parameters are $S_{12}$ and $S_{21}$, which are the reverse and forward voltage gains respectively. The reverse and forward voltage gains are each a measure of the coupling strength from the transmission line to the module antenna and vice versa. The reverse and forward voltage gains can be assumed to be identical. It is the coupling strength that is optimized to provide reliable operation independent of the number of electric battery cells in the electric battery arrangement 10. If the coupling strength were zero, then the reflection coefficient $\rho_{in}$ would be set solely by the transmission line $S_{11}$. However, communications would fail as there would be insufficient signal power for the receiver of the transceivers to operate. The minimum power required for a receiver to properly decode a received signal is the sensitivity, which is usually measured in dBm. Subtracting the sensitivity from the transmit power gives the dynamic range of the communication link and sets the minimum coupling strength that allows the communication link to operate. In practice, a 10 dB or 20 dB margin is provided for communication link robustness.

For a typical Short Range Device transceiver of the kind comprised in the electric battery arrangement 10, the sensitivity is around −95 dBm and the transmit power is −10 dBm. This yields a minimum $S_{12}$ and $S_{21}$ value of −85 dB. A 10 dB margin then gives a practical minimum of −75 dB to thereby meet the requirement that the coupling strength is sufficiently high that the signal power is sufficiently above the minimum required for the communication link to operate reliably.

The remaining constraint is to ensure the $S_{12}$ and $S_{21}$ values are sufficiently small that the VSWR is maintained at a level no more than 1.5. Rearranging Equation 1 above we obtain:

$$Ncells = \frac{(\rho_{in} - S_{11})(1 - S_{22}\rho_L)}{S_{12}S_{21}\rho_L} \qquad \text{Equation 2}$$

Figure 3:
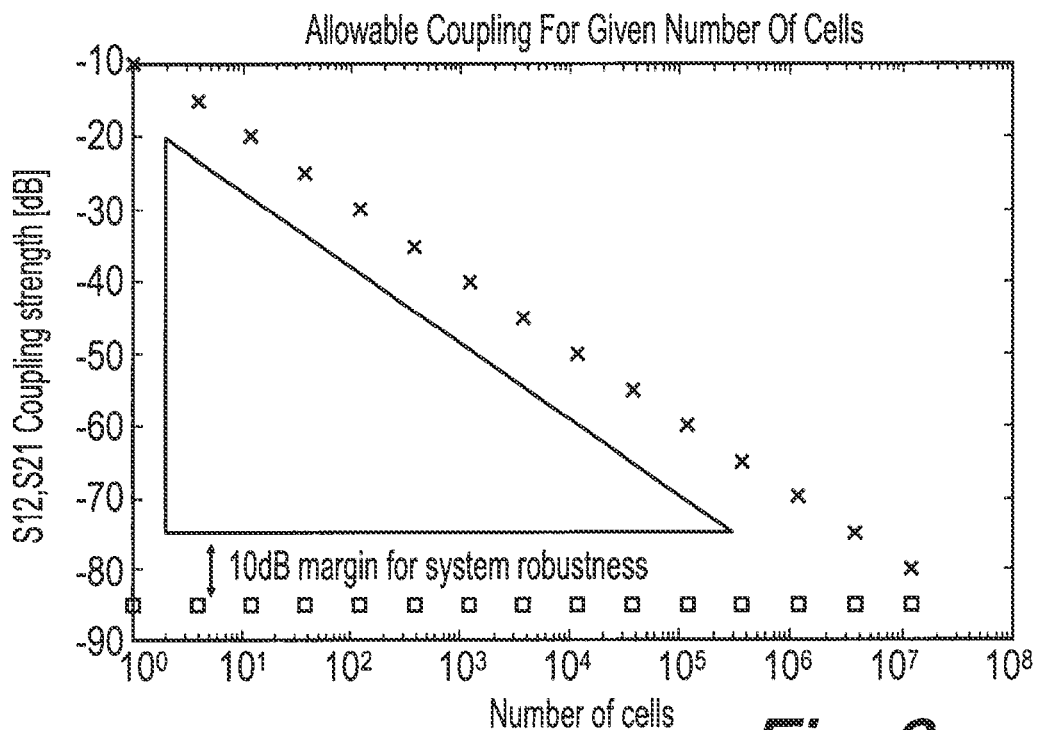
FIG. 3 is a graph showing coupling strength against number of module antenna in the electric battery arrangement of FIG. 1.

Equation 2 provides for plotting of a graph of coupling strength against number of module antennas as shown in FIG. 3. FIG. 3 shows both of the above described constraints. As can be seen from FIG. 3, as the number of electric battery cells 10 and hence module antennas in the electric battery arrangement 10 increases the permissible coupling strength drops. It should be noted that irrespective of the number of electric battery cells 10 the coupling strength should remain above the lower straight line shown in FIG. 3 defined by the line of small squares. A margin should be allowed for to provide for system robustness. The grey shaded triangle in FIG. 3 defines an operating area which provides such a margin.

Experimental results will now be provided. In an experimental arrangement, up to six open microstrip transmission lines were connected in series with an end termination of 50 Ohms. The transmission lines were loaded with 132 module antennas comprising a mixture of dummy loads, which were configured to appear electrically like an active load, and a smaller number of active loads configured with the Short Range Device transceiver device operating at 915 MHz. Communication in accordance with a protocol was achieved successfully in the experimental arrangement. The Received Signal Strength Indicator (RSSI) showed a coupling of about −40 dB for a single cell transceiver on the microstrip. This changed little when extended to six fully loaded microstrips. By varying the separation of the active load from the microstrip, the sensitivity was determined. Qualitatively the communication network worked well when the module antenna was within 20 to 30 mm of the microstrip. Beyond 30 mm the RSSI reduced rapidly until communication failed. With more than 100 mm of separation there was no signal detected.

Figure 4:
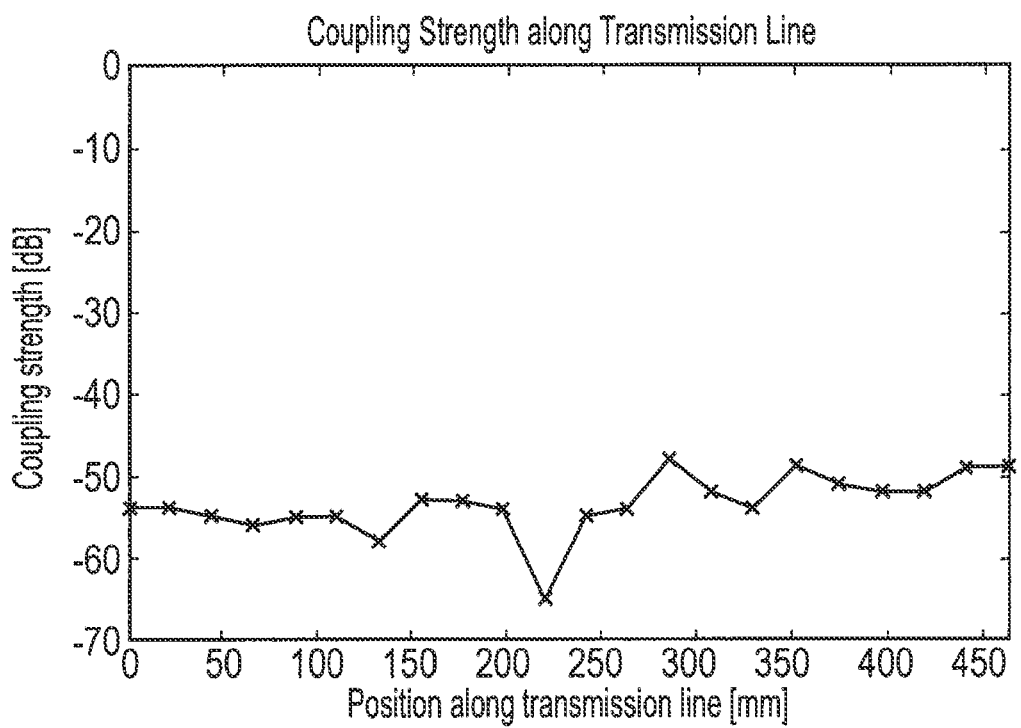
FIG. 4 is a graph showing variation in coupling strength as a module antenna is moved along the transmission line.

The module antenna was moved laterally across the microstrip by about 10 mm with little change in performance. The RSSI readings suggested that there is a first peak in coupling as one arm of the antenna loop moves over the microstrip, a small dip when the loop is centred, and a second peak in coupling as the other arm of the antenna loop passes over the microstrip, before falling away rapidly. This is desirable behaviour as the sweet spot is quite broad whereby requirement for precision in location of module antennas relative to the microstrip is reduced. Moving the module antenna along the microstrip provided signs of standing waves, as would be expected. Measurements of coupling strength in dB as the module antenna is moved along the transmission line are shown in FIG. 4. As can be seen from FIG. 4 the variation in coupling strength is 10 dB to 15 dB which corresponds to a VSWR of about 1.4.

Figure 5:
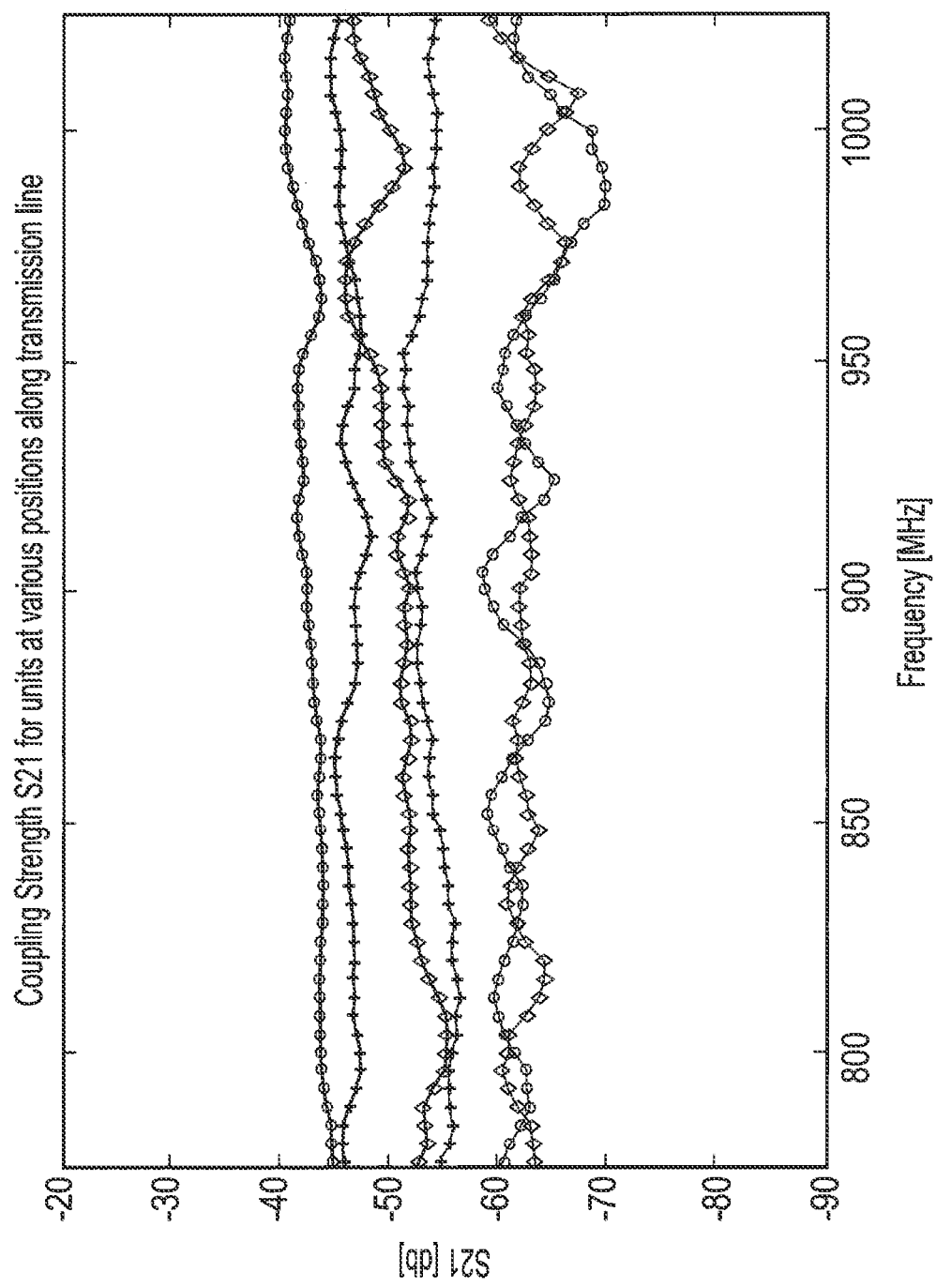
FIG. 5 is a graph showing variation in coupling strength with frequency for each of six module antennas arranged along the transmission line.

A Vector Network Analyzer was then used to measure the scattering parameters as the frequency of operation of the transceivers was varied between 700 MHz and 1.1 GHz. The measurements are represented in FIG. 5 which shows a graph of variation in coupling strength in the form of forward voltage gain against frequency for each of six module antennas arranged along the transmission line. The coupling strength determined by way of the Vector Network Analyzer corresponded well with what had been determined from RSSI measurements. As can be seen from FIG. 5, the response over the desired frequency range of 850 MHz to 950 MHz is generally flat with about 20 dB of variation for change of module antenna location along the microstrip.

The invention claimed is:

1. A transmission line operative as an antenna, for use with a plurality of electric battery cell modules, the transmission line comprising:

an elongate shape, the transmission line configured to provide near field radio wave coupling of data with each of the plurality of electric battery cell modules spaced apart along a length of the transmission line, each electric battery cell module comprising at least one electric battery cell and a module antenna, wherein the near field radio wave coupling is provided by the transmission line with the module antenna of each one of the plurality of electric battery cell modules.

2. The transmission line of claim 1, further comprising an end termination on the transmission line, the transmission line configured such that a Voltage Standing Wave Ratio (VSWR) for the transmission line is no more than 1.5.

3. The transmission line of claim 2, wherein the end termination is at least one of: matched to a characteristic impedance of the transmission line, or configured to absorb substantially all radio frequency energy in the transmission line in the absence of the module antenna.

4. The transmission line of claim 1, further comprising:
an active transceiver disposed at an end of the transmission line, the active transceiver configured to couple data packets to and from the transmission line.

5. The transmission line of claim 1, wherein the transmission line is a two-conductor transmission line.

6. The transmission line of claim 5, further comprising:
an elongated conductor and a ground plane, wherein the elongated conductor is substantially parallel to the ground plane.

7. The transmission line of claim 1, further comprising one or more of: a microstrip, a coaxial cable, or a twisted pair cable.

8. The transmission line of claim 1, wherein the near field coupling of data is provided with the module antenna of each one of the plurality of electric battery cell modules, when the transmission line is spaced apart from the module antenna of each one of the plurality of electric battery cell modules by no more than one wavelength of the near field radio waves.

9. An assembly comprising:
a plurality of electric battery cell modules, each electric battery cell module comprising at least one electric battery cell and a module antenna, wherein the electric battery cells are not operatively connected together as an electric battery; and
a rack configured to support the plurality of electric battery cell modules, the rack comprising a transmission line operative as an antenna, the transmission line comprising an elongate shape, the transmission line configured to provide near field radio wave coupling of data with each of the plurality of electric battery cell modules spaced apart along a length of the transmission line;
wherein the near field radio wave coupling is provided by the transmission line with the module antenna of each one of the plurality of electric battery cell modules.

10. The assembly of claim 9, wherein the transmission line is embedded in the rack.

11. The assembly of claim 9, wherein the transmission line provides battery management operations with each one of the electric battery cells.

12. The assembly of claim 9, wherein the near field coupling of data is provided with the module antenna of each one of the plurality of electric battery cell modules, when the transmission line is spaced apart from the module antenna of each one of the plurality of electric battery cell modules by no more than one wavelength of the near field radio waves.

13. The assembly of claim 9, further comprising:
an active transceiver disposed at an end of the transmission line, the active transceiver configured to couple data packets to and from the transmission line.

14. The assembly of claim 9, further comprising an end termination on the transmission line, the transmission line configured such that a Voltage Standing Wave Ratio (VSWR) for the transmission line is no more than 1.5.

15. The assembly of claim 14, wherein the end termination is at least one of: matched to a characteristic impedance of the transmission line, or configured to absorb substantially all radio frequency energy in the transmission line in the absence of the module antenna.

16. An electric battery arrangement comprising:
a plurality of electric battery cell modules electrically coupled to form an electric battery, each electric battery cell module comprising at least one electric battery cell and a module antenna;
a transmission line operative as an antenna, the transmission line comprising an elongate shape, the transmission line configured to provide near field radio wave coupling of data with each of the plurality of electric battery cell modules spaced apart along a length of the transmission line;
wherein the near field radio wave coupling is provided by the transmission line with the module antenna of each one of the plurality of electric battery cell modules.

17. The electric battery arrangement of claim 16, wherein the near field coupling of data is provided with the module antenna of each one of the plurality of electric battery cell modules, when the transmission line is spaced apart from the module antenna of each one of the plurality of electric battery cell modules by no more than one wavelength of the near field radio waves.

18. The electric battery arrangement of claim 16, further comprising:
an active transceiver disposed at an end of the transmission line, the active transceiver configured to couple data packets to and from the transmission line.

19. The electric battery arrangement of claim 16, further comprising an end termination on the transmission line, the transmission line configured such that a Voltage Standing Wave Ratio (VSWR) for the transmission line is no more than 1.5.

20. The electric battery arrangement of claim 19, wherein the end termination is at least one of: matched to a characteristic impedance of the transmission line, or configured to absorb substantially all radio frequency energy in the transmission line in the absence of the module antenna.

* * * * *